US008688940B2

(12) United States Patent
Sprouse et al.

(10) Patent No.: US 8,688,940 B2
(45) Date of Patent: Apr. 1, 2014

(54) METHOD FOR USING A CAPTCHA CHALLENGE TO PROTECT A REMOVABLE MOBILE FLASH MEMORY STORAGE DEVICE

(75) Inventors: Steven T. Sprouse, San Jose, CA (US); Carlos J. Gonzalez, Monte Sereno, CA (US); Ron Barzilai, Cupertino, CA (US); Dhaval Parikh, Santa Clara, CA (US)

(73) Assignee: SanDisk Technologies Inc., Plano, TX (US)

( * ) Notice: Subject to any disclaimer, the term of this patent is extended or adjusted under 35 U.S.C. 154(b) by 668 days.

(21) Appl. No.: 12/338,696

(22) Filed: Dec. 18, 2008

(65) Prior Publication Data

US 2010/0161927 A1 Jun. 24, 2010

(51) Int. Cl.
*G06F 12/00* (2006.01)

(52) U.S. Cl.
USPC .......................................... 711/163; 711/103

(58) Field of Classification Search
USPC ................................................ 711/163, 103
See application file for complete search history.

(56) References Cited

U.S. PATENT DOCUMENTS

| 6,195,698 | B1* | 2/2001 | Lillibridge et al. ........... 709/225 |
| 2004/0010656 | A1 | 1/2004 | Chiao et al. |
| 2005/0114705 | A1 | 5/2005 | Reshef et al. |
| 2006/0259652 | A1* | 11/2006 | Poo .................................. 710/8 |
| 2007/0045417 | A1* | 3/2007 | Tsai et al. ...................... 235/441 |
| 2007/0143624 | A1 | 6/2007 | Steeves |
| 2008/0072293 | A1* | 3/2008 | D'Urso ............................ 726/4 |
| 2009/0113294 | A1* | 4/2009 | Sanghavi et al. ............. 715/269 |
| 2010/0023650 | A1* | 1/2010 | Prevost et al. .................. 710/16 |

FOREIGN PATENT DOCUMENTS

| CN | 1467750 A | 1/2004 |
| CN | 101120352 A | 2/2008 |
| WO | WO 2006/069194 | 6/2006 |
| WO | WO 2008/118602 | 10/2008 |

OTHER PUBLICATIONS

Non Patent Literature, "reCAPTCHA: Human-Based Character Recognition via Web Security Measures", Luis von Ahn, Sep. 12, 2008, pp. 1465-1468.*
International Search Report and Written Opinion for PCT Application Serial No. PCT/US2009/0006173, dated Mar. 1, 2010, 10 pages.
Von Ahn et al., "Telling Humans and Computers Apart Automatically", *Communications of the Association for Computing Machinery*, ACM, New York, NY, vol. 47, No. 2, Feb. 2004, pp. 57-60.

(Continued)

*Primary Examiner* — Matthew Bradley
(74) *Attorney, Agent, or Firm* — Brinks Gilson & Lione

(57) ABSTRACT

The embodiments described herein generally use a challenge to protect a removable mobile flash memory storage device, where the challenge may be in the form of a "Completely Automated Public Turing Test to Tell Computers and Humans Apart" ("CAPTCHA"). In one embodiment, a method is provided in which a removable mobile flash memory storage device receives a command from a host device, generates a CAPTCHA challenge, provides the CAPTCHA challenge to the host device, receives a response to the CAPTCHA challenge from the host device, determines if the response satisfies the CAPTCHA challenge, and performs the command only if the response satisfies the CAPTCHA challenge. In another embodiment, a removable mobile flash memory storage device is provided for performing these acts.

14 Claims, 3 Drawing Sheets

(56) References Cited

OTHER PUBLICATIONS

"United States Patent and Trademark Office—Patent Application Information Retrieval," http://portal.uspto.gov/external/portal/pair, 1 page, printed Dec. 10, 2008.

"CAPTCHA, from Wikipedia," http://en.wikipedia.org/wiki/Captcha, 8 pages, printed Mar. 26, 2008.

Office Action (with English Translation) for Chinese Patent Application Serial No. 200980150774X dated Jul. 2, 2013, 11 pages.

\* cited by examiner

METHOD FOR USING A CAPTCHA CHALLENGE TO PROTECT A REMOVABLE MOBILE FLASH MEMORY STORAGE DEVICE

BACKGROUND

Some removable mobile flash memory storage device, such as universal serial bus (USB) devices or memory cards, have a write-protect switch to prevent accidental or intentional deletion of data stored in the removable mobile flash memory storage device. For example, if a write-protect switch is enabled, a user would be prevented from accidentally reformatting the removable mobile flash memory storage device, as the user would need to take a special step (i.e., moving the switch to the disabled position) to authorize a command that would result in loss of data stored in the removable mobile flash memory storage device. The write-protect switch, when enabled, also serves as a security mechanism against malware (e.g., a virus running on a host device) issuing a command that would result in loss of data stored in the removable mobile flash memory storage device. Additionally, some removable mobile flash memory storage devices provide data security by using a trusted third party to vet commands; however, the use of a trusted third party may not be available or convenient in many situations.

SUMMARY

Embodiments of the present invention are defined by the claims, and nothing in this section should be taken as a limitation on those claims.

By way of introduction, the embodiments described below generally use a challenge to protect a removable mobile flash memory storage device, where the challenge may be in the form of a "Completely Automated Public Turing Test to Tell Computers and Humans Apart" ("CAPTCHA"). In one embodiment, a method is provided in which a removable mobile flash memory storage device receives a command from a host device, generates a CAPTCHA challenge, provides the CAPTCHA challenge to the host device, receives a response to the CAPTCHA challenge from the host device, determines if the response satisfies the CAPTCHA challenge, and performs the command only if the response satisfies the CAPTCHA challenge. In another embodiment, a removable mobile flash memory storage device is provided for performing these acts.

Other embodiments are possible, and each of the embodiments can be used alone or together in combination. Accordingly, various embodiments will now be described with reference to the attached drawings.

DETAILED DESCRIPTION OF THE PRESENTLY PREFERRED EMBODIMENTS

Figure 1:
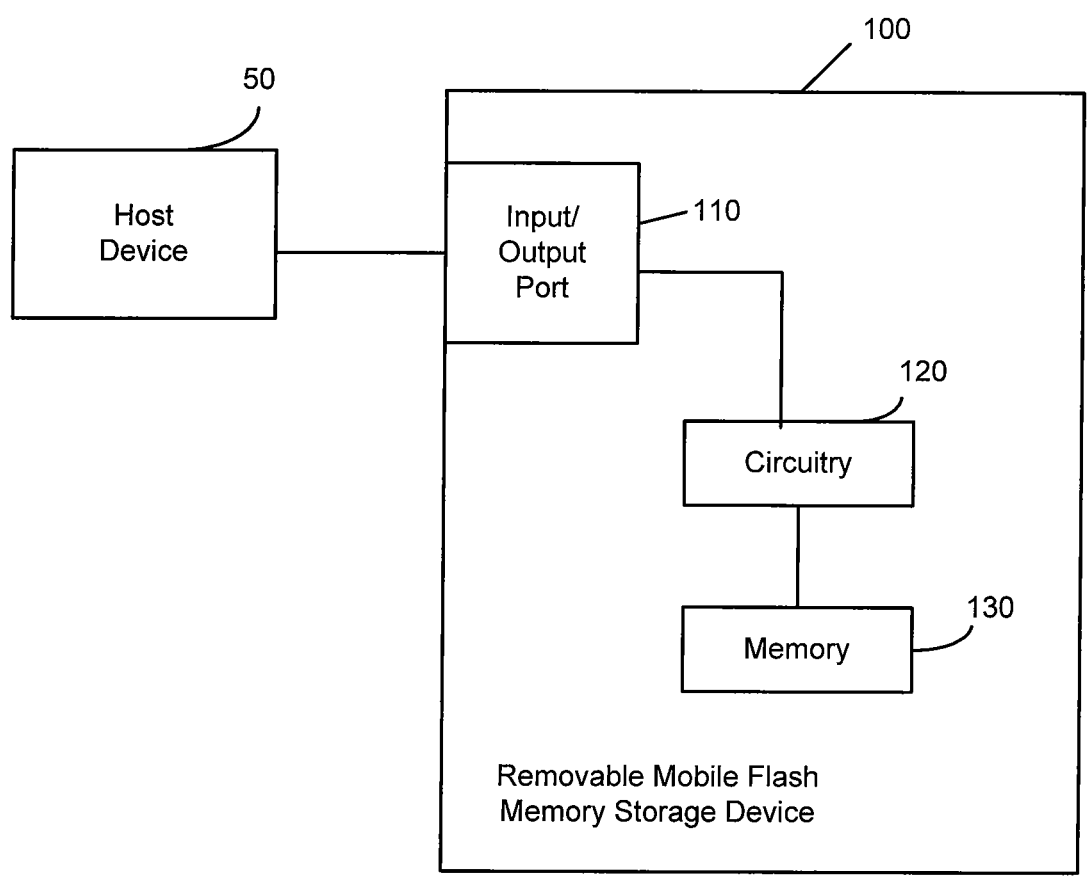
FIG. 1 is a block diagram of a host device and a removable mobile flash memory storage device of an embodiment.

The detailed description that follows describe embodiments that generally use a challenge to protect a removable mobile flash memory storage device against accidental or intentional deletion of data without the need for a write-protect switch or a trusted third party to vet commands. Such challenge may be in the form of a "Completely Automated Public Turing Test to Tell Computers and Humans Apart" ("CAPTCHA"). Turning now to the drawings, FIG. 1 is a block diagram of a host device 50 in communication with a removable mobile flash memory storage device 100 of an embodiment. The host device 50 can take any suitable form, such as, but not limited to, a personal computer, a mobile phone, a game device, a personal digital assistant (PDA), an email/text messaging device, a digital camera, a digital media (e.g., MP3) player, a GPS navigation device, and a TV system. The removable mobile flash memory storage device 100 can also take any suitable form, such as, but not limited to, a universal serial bus (USB) device and a memory card.

As shown in FIG. 1, the removable mobile flash memory storage device 100 of this embodiment comprises an input/output port 110, circuitry 120, and a memory 130. The removable mobile flash memory storage device 100 can comprise additional components, which are not shown in FIG. 1 to simplify the drawing. As explained in more detail below, in some embodiments, the use of a CAPTCHA challenge is a substitute for having a write-protect switch (e.g., a physical switch movable by a user between a first position that allows writes to the removable mobile flash memory storage device 100 and a second position that prevents writes to the removable mobile flash memory storage device 100). So, in those embodiments, the removable mobile flash memory storage device 100 would be free of a write-protect switch. However, in other embodiments, the removable mobile flash memory storage device 100 both uses a CAPTCHA challenge and has a write-protect switch.

The input/output port 110 is used to place the removable mobile flash memory storage device 100 in communication with the host device 50. As used herein, the phrase "in communication with" means in direct communication with or in indirect communication with via one or more components named or unnamed herein (e.g., a memory card reader). The host device 50 and the removable mobile flash memory storage device 100 can be in communication with each other via a wired or wireless connection. For example, in one embodiment, the input/output port 110 comprises pins (or a socket) to mate with a corresponding socket (or pins) on the host device 50 to establish an electrical and physical connection. In another embodiment, the input/output port 110 comprises a wireless transceiver to place the host device 50 and removable mobile flash memory storage device 100 in wireless communication with each other. In one preferred embodiment, the mobile flash memory storage device 100 is a local storage device for the host device 50 and, accordingly, uses mass storage protocols and not network (e.g., internet) protocols.

As an alternative to being flash memory, the memory 130 can take the form of, for example, another type of solid-state memory, optical memory, and magnetic memory. Also, the memory 130 can be one-time programmable, few-time programmable, or many-time programmable. Further, although shown as one box in FIG. 1, the memory 130 can take the form of several components. The circuitry 120 can take the form of one or more of a microprocessor or processor and a computer-readable medium that stores computer-readable program code (e.g., software or firmware) executable by the (micro)

processor, logic gates, switches, an application specific integrated circuit (ASIC), a programmable logic controller, and an embedded microcontroller, for example. A wide variety of circuitry can be used to generate a CAPTCHA since only a relatively small amount of RAM is used as a workspace to manipulate graphics and the set of graphical manipulation routines is relatively simple. Example of suitable circuitry include, but are not limited to, the following microcontrollers: ARC 625D, Atmel AT91SAM, Microchip PIC18F26K20, and Silicon Labs C8051F320. As will be described in more detail below, the circuitry 120 is operative to perform functions relating to using a CAPTCHA challenge to protect the removable mobile flash memory storage device 100. The circuitry 120 can also be designed to perform additional functions, if desired.

In general, a CAPTCHA challenge is a challenge that preferably can only be responded to correctly by a human and not by a computer. A CAPTCHA challenge can be considered a "human test" and is often used to restrict access to websites or to authorize the creation of web accounts. There are different forms of CAPTCHA challenges, the most common form of which is a sequence of randomly-generated characters or symbols that are distorted in such a way as to make it impossible (or at least very difficult) for a machine to discern the characters from the image but not impossible for a human. Accordingly, if a response to the CAPTCHA challenge matches the characters in the distorted image, the responder is likely a human and not a computer. In this way, a CAPTCHA challenge can be used to protect the removable mobile flash memory storage device 100 against attacks from viruses and other malware that attempt to cause the removable mobile flash memory storage device 100 to perform some unauthorized and potentially destructive act. That is, instead of automatically performing a command issued by the host device 50, the removable mobile flash memory storage device 100 can use a CAPTCHA challenge to ensure that the command is coming from a human user instead of from malware. If the CAPTCHA challenge is responded to successfully, it is likely that a human user intentionally issued the command, and the removable mobile flash memory storage device 100 can perform the command. However, if the command is coming from malware, the removable mobile flash memory storage device 100 will not receive a satisfactory response to the CAPTCHA challenge and, accordingly, will not perform the command. The use of a CAPTCHA challenge is especially desirable if the removable mobile flash memory storage device 100 does not have a write-protect switch (or has a write-protect switch that is not enabled when the potentially-hazardous command is issued) since only a human response to the CAPTCHA challenge would authorize the performance of the command.

Figure 2:
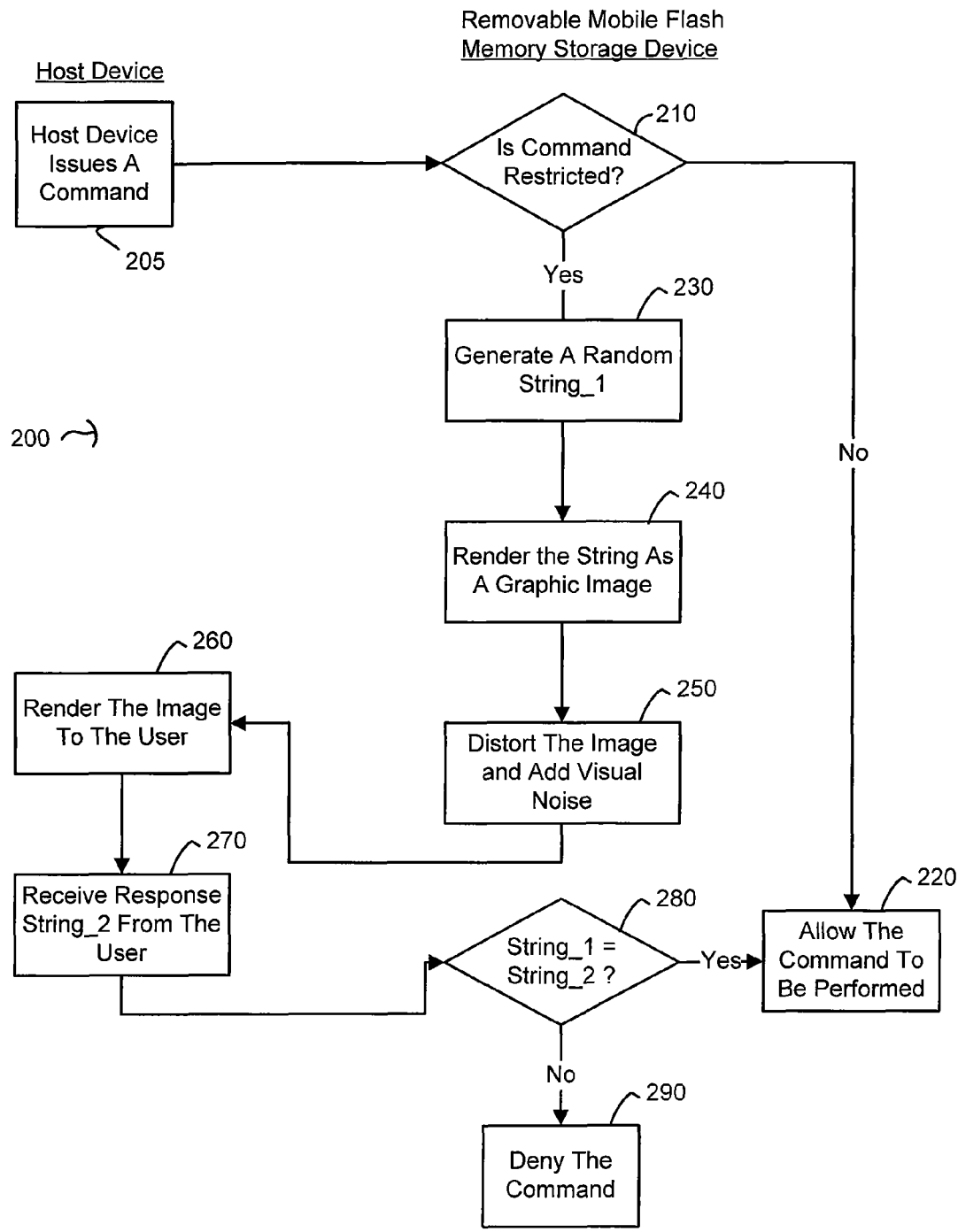
FIG. 2 is a flow chart of a method of an embodiment for using a CAPTCHA challenge to protect a removable mobile flash memory storage device.

Returning to the drawings, FIG. 2 is a flow chart 200 of a method of an embodiment for using a CAPTCHA challenge to protect the removable mobile flash memory storage device 100. As shown in FIG. 2, when the host device 50 issues a command to the removable mobile flash memory storage device 100 (act 205), the removable mobile flash memory storage device 100 receives the command, and the circuitry 120 in the removable mobile flash memory storage device 100 determines if the command is a restricted command (act 210). If the circuitry 120 determines that the command is not a restricted command, the circuitry 120 allows the command to be performed (act 220). However, if the circuitry 120 determines that the command is a restricted command, the circuitry 120 uses a CAPTCHA challenge to protect the removable mobile flash memory storage device 100, as will be discussed in more detail below (acts 230-280).

A "restricted command" can be any designated command and, in one embodiment, is a command that, if performed, would cause a loss of data stored in the removable mobile flash memory storage device 100, change the configuration of the removable mobile flash memory storage device 100, or authorize access to a restricted area in the removable mobile flash memory storage device 100, for example. In embodiments in which the use of a CAPTCHA challenge serves as a replacement for a write-protect switch on the removable mobile flash memory storage device 100, a restricted command can be a command that would not be performed if the write-protect switch were present on the removable mobile flash memory storage device 100 and enabled. Restricted commands can include, but are not limited to, a command to write data to the removable mobile flash memory storage device 100, a command to read data from the removable mobile flash memory storage device 100, a command to reformat the removable mobile flash memory storage device 100, a command to erase data from the removable mobile flash memory storage device 100, a command to update firmware on the removable mobile flash memory storage device 100, a command to obtain diagnostic data (such as, but not limited to, a number of memory errors, a number of bytes written to the removable mobile flash memory storage device 100 in its lifetime, and a number of hours of operation of the removable mobile flash memory storage device 100, etc.) from the removable mobile flash memory storage device 100, a command to partition the removable mobile flash memory storage device 100, and a command relating to cryptographic capabilities of the removable mobile flash memory storage device 100 (e.g., accessing secret keys and signing data). It should be noted that, in this particular embodiment, a CAPTCHA challenge is used only if a command from the host device 50 is a restricted command. In other embodiments, a CAPTCHA challenge can be used for commands in addition to or instead of restricted commands. For example, a CAPTCHA challenge can be used for every command issued by the host device 50, can be used only for a random number of commands, can be customized for certain users/operations, etc.

Figure 3:
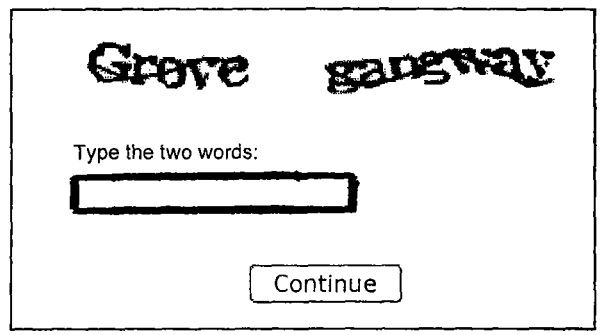
FIG. 3 is an illustration of a CAPTCHA challenge used in an embodiment in which the CAPTCHA challenge requires a user to identify at least one distorted image.

Returning to the flow chart 200 of FIG. 2, in response to the circuitry 120 determining that the command from the host device 50 is a restricted command, the circuitry 120 provides a CAPTCHA challenge to be completed by a user of the host device 50 to ensure that the restricted command is coming from a human user. In this particular example, the CAPTCHA challenge requires a user to identify at least one distorted image, although other CAPTCHA challenges can be used (e.g., requiring a user to identify at least one distorted sound). As shown in FIG. 2, in this embodiment, the circuitry 120 generates a random sting ("String_1") (act 230), renders the random string as a graphic image (act 240), and then distorts the image and adds visual noise (act 250). (Preferably, the random sting ("String_1") is stored in a hidden area of the memory 130 or other part of the removable mobile flash memory storage device 100, so a virus cannot search the removable mobile flash memory storage device 100 to find the correct string to enter in response to the challenge.) The circuitry 120 then sends the image to the host device 50, which renders the image to the user. For example, as shown in FIG. 3, the host device 50 displays the distorted images "Grove" and "gangway" to the user, along with a text-entry box and instructions for the user to type-in the two displayed words. The user then types-in or otherwise provides his guess as to what the image says, and the host device 50 receives the response ("String_2") (act 270). The host device 50 then sends the response to the removable mobile flash memory storage device 100, and the circuitry 120 in the removable mobile flash memory storage device 100 determines if the response satisfies the CAPTCHA challenge. In this embodiment, the response is deemed to satisfy the CAPTCHA challenge if the response is an exact match to the random string used to generate the image (i.e., if "String_1"="String_2") (act 280). (In other embodiments, a less-than-perfect match, within some degree of error, may be deemed to satisfy the challenge, especially if the visual distortion makes it difficult for even a human to discern the characters.) If the circuitry 120 determines that the response satisfies the challenge, the circuitry 120 allows the command to be performed (act 220). Otherwise, the circuitry 120 denies the command (act 290).

There are several advantages associated with these embodiments. First, as noted above, using a CAPTCHA challenge can protect the removable mobile flash memory storage device 100 against attacks from viruses and other malware attempting to cause the removable mobile flash memory storage device 100 to perform some unauthorized and potentially destructive act. By using a CAPTCHA challenge in the authorization protocol to gain access to or perform restricted operations on the removable mobile flash memory storage device 100, the removable mobile flash memory storage device 100 can ensure that a human user—and not malware—is requesting that a command be performed. Additionally, because the removable mobile flash memory storage device 100 generates the CAPTCHA challenges and determines whether a response is satisfactory, the protections provided by these embodiments are not tied to a specific host device, as the host device is used merely to deliver the CAPTCHA challenge and receive a response. This is especially advantageous in situations where the removable mobile flash memory storage device 100 is likely to be used with a number of host devices (e.g., when the removable mobile flash memory storage device 100 is a USB drive or a memory card used to transport data among several different host devices). In these situations, the removable mobile flash memory storage device 100 carries the CAPTCHA protection with it and does not need to depend on whatever protections, if any, are present on a given host device. Also, as mentioned above, the CAPTCHA protections offered by these embodiments make it possible to provide write-protection without a physical write-protect switch on the removable mobile flash memory storage device 100. Eliminating the physical write-protect switch can simplify the industrial design of the removable mobile flash memory storage device 100 and lower its manufacturing cost. Of course, the CAPTCHA protections offered by these embodiments can also be used in conjunction with removable mobile flash memory storage devices that do have physical write-protect switches. In such situations, a CAPTCHA challenge can provide protection against malware in situations where the write-protect switch is in a disabled position.

Figure 4:
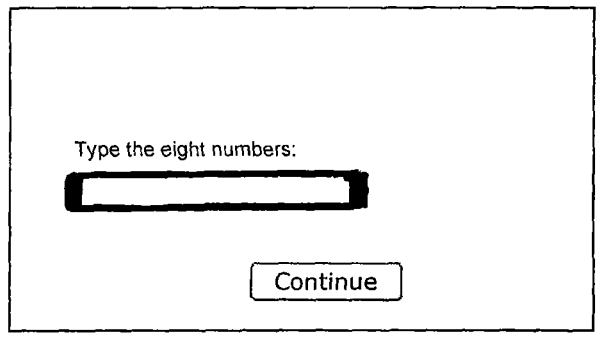
FIG. 4 is an illustration of a CAPTCHA challenge used in an embodiment in which the CAPTCHA challenge requires a user to identify at least one distorted sound.

It should be noted that many alternatives can be used with these embodiments. For example, as mentioned above, various types of CAPTCHA challenges can be used. So, instead of a CAPTCHA challenge requiring a user to identify at least one distorted image, the CAPTCHA challenge can require a user to identify at least one distorted sound. For example, as shown in FIG. 4, the removable mobile flash memory storage device 100 can provide the host device 50 with a distorted audio recording of eight numbers and prompt the user to type-in or otherwise provide the eight numbers just played. As another alternative, instead of typing-in a response to a CAPTCHA challenge, a user can provide a response by speaking into a microphone or providing some other input. Also, instead of providing a distorted image and/or distorted audio, a CAPTCHA challenge can present a question that requires a user answer that could not be provided automatically by a computer. Because a CAPTCHA challenge can take many forms, the below claims should not be read as requiring a specific form of a CAPTCHA challenge unless explicitly recited. Also, the acts described above can be performed in any suitable order. For example, the flow chart 200 of FIG. 2 shows the generation of a CAPTCHA challenge (act 230) after it is determined that the command from the host device 50 is a restricted command (act 240). However, in an alternate embodiment, the removable mobile flash memory storage device 100 can generate and store one or more CAPTCHA challenges in advance and merely retrieve a stored CAPTCHA challenge in response to the determination that the command is a restricted command. Further, while the sequence of characters that were used in the above example for the CAPTCHA challenge were randomly generated, in other embodiments, the sequence of characters is not randomly generated.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A method for using a "Completely Automated Public Turing Test to Tell Computers and Humans Apart" ("CAPTCHA") challenge to protect a removable mobile flash memory storage device, the method comprising:

performing by a removable mobile flash memory storage device in communication with a host device, wherein the removable mobile flash memory storage device lacks a physical write-protect switch movable by a user between a first position that allows writes to the removable mobile flash memory storage device and a second position that prevents writes to the removable mobile flash memory storage device:

receiving a command from the host device;

determining if the command is a restricted command, wherein a restricted command is a command that would not be performed if a write-protect switch were present on the removable mobile flash memory storage device and in the second position;

only if the command is a restricted command:
generating a CAPTCHA challenge;
providing the CAPTCHA challenge to the host device;
receiving a response to the CAPTCHA challenge from the host device;
determining if the response satisfies the CAPTCHA challenge; and
performing the command only if the response satisfies the CAPTCHA challenge;

wherein the CAPTCHA challenge is provided to the host device on a command-by-command basis only if it is determined that the command is a restricted command, and wherein the CAPTCHA challenge is a substitute for having a write-protect switch on the removable mobile flash memory storage device.

2. The method of claim 1, wherein a restricted command is a command that, if performed, would cause a loss of data stored in the removable mobile flash memory storage device.

3. The method of claim 1, wherein a restricted command comprises one or more of the following commands: a command to write data to the removable mobile flash memory storage device, a command to read data from the removable mobile flash memory storage device, a command to reformat the removable mobile flash memory storage device, a command to erase data from the removable mobile flash memory storage device, a command to update firmware on the removable mobile flash memory storage device, a command to obtain diagnostic data from the removable mobile flash memory storage device, a command to partition the removable mobile flash memory storage device, and a command relating to cryptographic capabilities of the removable mobile flash memory storage device.

4. The method of claim 1, wherein the CAPTCHA challenge requires a user to identify at least one distorted image.

5. The method of claim 1, wherein generating the CAPTCHA challenge comprises:
generating a random string;
rendering the random string as a graphic image; and
distorting and adding visual noise to the graphic image.

6. The method of claim 1, wherein the removable mobile flash memory storage device comprises a universal serial bus (USB) device.

7. The method of claim 1, wherein the removable mobile flash memory storage device comprises a memory card.

8. A removable mobile flash memory storage device lacking a physical write-protect switch movable by a user between a first position that allows writes to the removable mobile flash memory storage device and a second position that prevents writes to the removable mobile flash memory storage device, the removable mobile flash memory storage device comprising:
an input/output port configured to connect the removable mobile flash memory storage device with a host device;
a memory; and
circuitry in communication with the input/output port and the memory, wherein the circuitry is operative to:
receive a command from the host device;
determine if the command is a restricted command, wherein a restricted command is a command that would not be performed if a write-protect switch were present on the removable mobile flash memory storage device and in the second position;
only if the command is a restricted command:
generate a CAPTCHA challenge;
provide the CAPTCHA challenge to the host device;
receive a response to the CAPTCHA challenge from the host device;
determine if the response satisfies the CAPTCHA challenge; and
performing the command only if the response satisfies the CAPTCHA challenge;
wherein the CAPTCHA challenge is provided to the host device on a command-by-command basis only if it is determined that the command is a restricted command, and wherein the CAPTCHA challenge is a substitute for having a write-protect switch on the removable mobile flash memory storage device.

9. The removable mobile flash memory storage device of claim 8, wherein a restricted command is a command that, if performed, would cause a loss of data stored in the removable mobile flash memory storage device.

10. The removable mobile flash memory storage device of claim 8, wherein a restricted command comprises one or more of the following commands: a command to write data to the removable mobile flash memory storage device, a command to read data from the removable mobile flash memory storage device, a command to reformat the removable mobile flash memory storage device, a command to erase data from the removable mobile flash memory storage device, a command to update firmware on the removable mobile flash memory storage device, a command to obtain diagnostic data from the removable mobile flash memory storage device, a command to partition the removable mobile flash memory storage device, and a command relating to cryptographic capabilities of the removable mobile flash memory storage device.

11. The removable mobile flash memory storage device of claim 8, wherein the CAPTCHA challenge requires a user to identify at least one distorted image.

12. The removable mobile flash memory storage device of claim 8, wherein the circuitry is operative to generate the CAPTCHA challenge by:
generating a random string;
rendering the random string as a graphic image; and
distorting and adding visual noise to the graphic image.

13. The removable mobile flash memory storage device of claim 8, wherein the removable mobile flash memory storage device comprises a universal serial bus (USB) device.

14. The removable mobile flash memory storage device of claim 8, wherein the removable mobile flash memory storage device comprises a memory card.

* * * * *

UNITED STATES PATENT AND TRADEMARK OFFICE
CERTIFICATE OF CORRECTION

PATENT NO. : 8,688,940 B2
APPLICATION NO. : 12/338696
DATED : April 1, 2014
INVENTOR(S) : Sprouse et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 807 days.

Signed and Sealed this
Thirtieth Day of May, 2017

Michelle K. Lee
*Director of the United States Patent and Trademark Office*